(12) United States Patent
Iwasawa et al.

(10) Patent No.: US 11,216,708 B2
(45) Date of Patent: Jan. 4, 2022

(54) INFORMATION PROCESSING APPARATUS, IMAGE FORMING SYSTEM, AND NON-TRANSITORY COMPUTER READABLE MEDIUM

(71) Applicant: FUJIFILM BUSINESS INNOVATION CORP., Tokyo (JP)

(72) Inventors: Masayuki Iwasawa, Kanagawa (JP); Shingo Kato, Kanagawa (JP); Sawako Umeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/773,046

(22) Filed: Jan. 27, 2020

(65) Prior Publication Data

US 2021/0081730 A1    Mar. 18, 2021

(30) Foreign Application Priority Data

Sep. 13, 2019  (JP) .............................. JP2019-166845

(51) Int. Cl.
*G06F 15/00* (2006.01)
*G06K 15/02* (2006.01)

(52) U.S. Cl.
CPC ....... *G06K 15/1805* (2013.01); *G06K 15/027* (2013.01)

(58) Field of Classification Search
CPC .......................... G06K 15/1805; G06K 15/027

USPC ......................................................... 358/1.2
See application file for complete search history.

(56) References Cited

U.S. PATENT DOCUMENTS

| 8,851,599 | B2 * | 10/2014 | Tanase | B41J 2/2135 |
| | | | | 347/9 |
| 2005/0058476 | A1 * | 3/2005 | Murakami | G03G 21/043 |
| | | | | 399/366 |
| 2019/0349486 | A1 * | 11/2019 | Ohara | G06F 3/1289 |

FOREIGN PATENT DOCUMENTS

| JP | 2001-159959 A | 6/2001 |
| JP | 2012-018520 A | 1/2012 |
| JP | 2012-018530 A | 1/2012 |

* cited by examiner

*Primary Examiner* — Mark R Milia
(74) *Attorney, Agent, or Firm* — Oliff PLC

(57) ABSTRACT

An information processing apparatus includes a presentation unit, a receiver, a storage, and a controller. The presentation unit is configured to present at least one piece of information on image quality for each of plural models of image forming apparatuses. The receiver is configured to receive a setting value related to image quality from the information on the image quality presented by the presentation unit. The storage is configured to store the setting value related to the image quality received by the receiver for each of the models of the image forming apparatuses. The controller is configured to control the image forming apparatus of a corresponding model according to the setting value related to the image quality stored by the storage.

8 Claims, 10 Drawing Sheets

INFORMATION PROCESSING APPARATUS, IMAGE FORMING SYSTEM, AND NON-TRANSITORY COMPUTER READABLE MEDIUM

CROSS-REFERENCE TO RELATED APPLICATION(S)

This application is based on and claims priority under 35 USC 119 from Japanese Patent Application No. 2019-166845 filed on Sep. 13, 2019.

BACKGROUND

(i) Technical Field

The present disclosure relates to an information processing apparatus, an image forming system, and a non-transitory computer readable medium.

(ii) Related Art

JP-A-2012-018530 discloses a printing system that includes an information processing apparatus configured to generate and transmit print data, and a printing apparatus including an image processing device configured to generate image data for printing based on the print data from the information processing apparatus. The information processing apparatus and the image processing device are capable of bidirectional communication. The information processing apparatus includes a print data generator configured to generate print data described in a printer description language including information on printing and information on image quality of drawing data, a transmitter configured to transmit the print data generated by the print data generator to the image processing device, a receiver configured to receive correction information on the image quality of the drawing data that is transmitted from the image processing device in response to transmission of the print data by the transmitter, and a print setting reflecting unit configured to reflect the correction information received by the receiver in print setting for the drawing data. The image processing device includes a receiver configured to receive the print data from the information processing apparatus, an analysis unit configured to analyze the information on the printing and the information on the image quality of the drawing data included in the print data received by the receiver, a correction information generator configured to generate the correction information on the image quality of the drawing data based on an analysis result by the analysis unit, and a transmitter configured to transmit the correction information generated by the correction information generator to the information processing apparatus.

JP-A-2001-159959 discloses a periphery device control method for controlling a peripheral device connected to a host device. The periphery device control method includes: storing setting information corresponding to plural models on a model-by-model basis; acquiring model identification information of the peripheral device; selecting the setting information of the model corresponding to the acquired model identification information from the stored setting information; and determining an operation mode for controlling the peripheral device according to the selected setting information.

SUMMARY

Aspects of non-limiting embodiments of the present disclosure relate to an information processing apparatus, an image forming system, and a non-transitory computer readable medium capable of printing with image quality corresponding to a model of an image forming apparatus when image formation is controlled based on a setting value common to plural models of image forming apparatuses.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a presentation unit, a receiver, a storage, and a controller. The presentation unit is configured to present at least one piece of information on image quality for each of plural models of image forming apparatuses. The receiver is configured to receive a setting value related to image quality from the information on the image quality presented by the presentation unit. The storage is configured to store the setting value related to the image quality received by the receiver for each of the models of the image forming apparatuses. The controller is configured to control the image forming apparatus of a corresponding model according to the setting value related to the image quality stored by the storage.

BRIEF DESCRIPTION OF THE DRAWINGS

Exemplary embodiment(s) of the present disclosure will be described in detail based on the following figures, wherein.

DETAILED DESCRIPTION

Next, exemplary embodiments of the present disclosure will be described with reference to the drawings.

Figure 1:
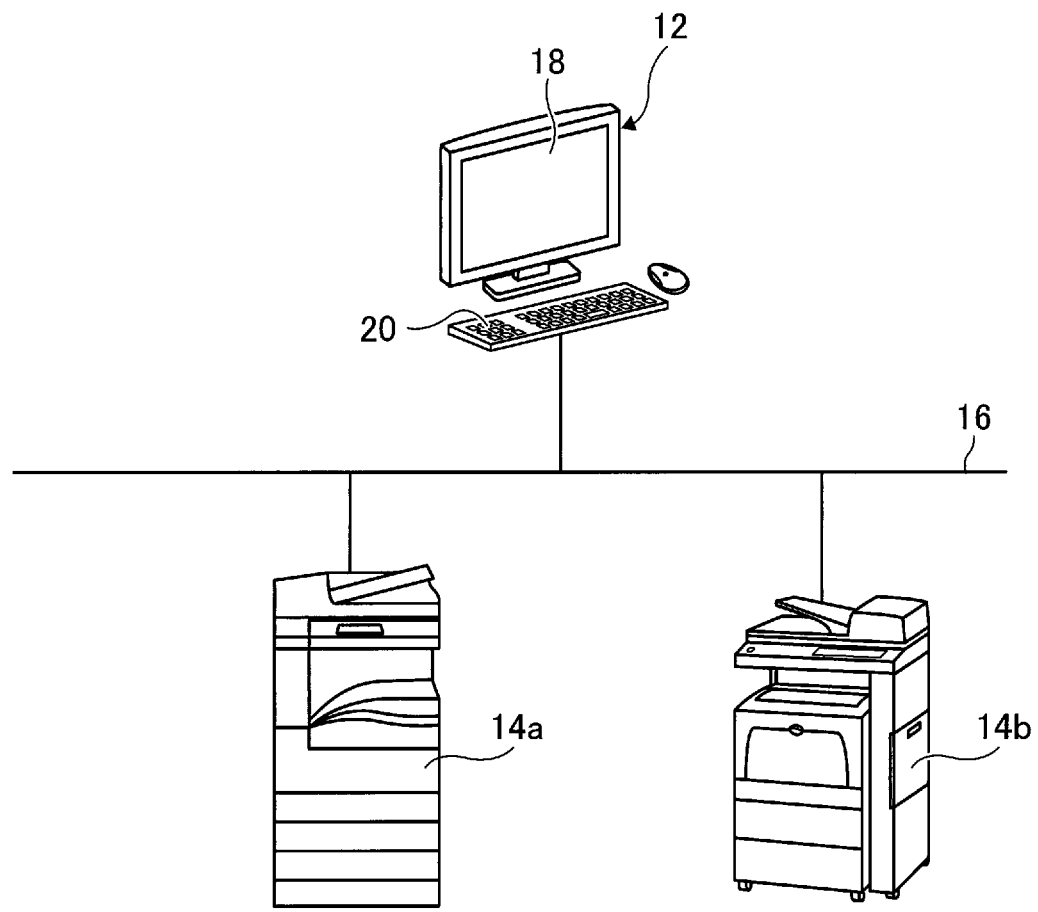
FIG. 1 is a block diagram showing an image forming system according to a first exemplary embodiment of the present disclosure.

FIG. 1 shows an image forming system 10 according to a first exemplary embodiment of the present disclosure.

In the image forming system 10, a terminal device 12 that is, for example, a personal computer, and plural image forming apparatuses 14a, 14b are connected to each other via a network 16. The terminal device 12 includes a display device 18 such as a liquid crystal display, and an input device 20 such as a keyboard and a mouse. The network 16 may be a local area network or the Internet.

Figure 2:
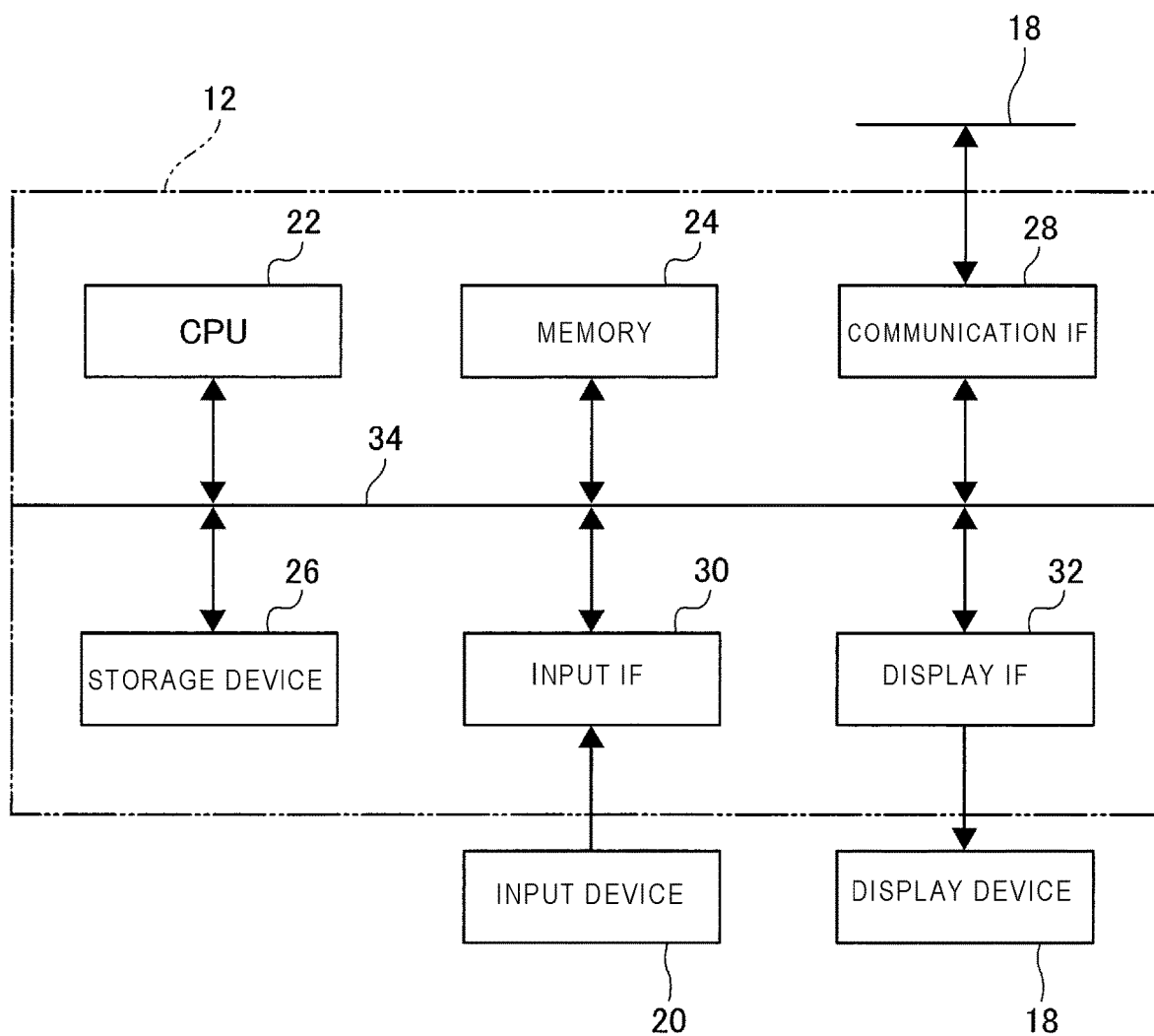
FIG. 2 is a block diagram showing hardware of an information processing apparatus according to the first exemplary embodiment of the present disclosure.

As shown in FIG. 2, the terminal device 12 includes a CPU 22, a memory 24, a storage device 26, a communication interface 28, an input interface 30, and a display interface 32. The CPU 22, the memory 24, the storage device 26, the communication interface 28, the input interface 30, and the display interface 32 are connected to each other via a bus 34.

The CPU 22 executes a predetermined process based on a control program stored in the memory 24. The storage device 26 includes, for example, a hard disk, and stores necessary software and data. The communication interface 28 inputs and outputs data through the network 16. The input interface 30 is connected to the input device 20, and receives data input from the input device 20. The display interface 32 is connected to the display device 18, and outputs data to the display device 18 to display the data on the display device 18.

The image forming apparatuses 14a, 14b are different in a model. However, the terminal device 12 is installed with a printer driver (hereinafter, referred to as a "common printer driver") common to the image forming apparatuses 14a, 14b that are different. The common printer driver is software for controlling an image forming apparatus that can be commonly used for the image forming apparatuses that are different in the model. Settings of functions and image quality of the image forming apparatuses that common to models are made in the common printer driver.

The page description language (PDL) performs tone processing for each object in an image. A way of performing the tone processing may differ depending on a type of an object in interest. For example, for a character/graphic object, the tone processing is performed based on a value in a lookup table (hereinafter referred to as a "lookup table value") for a dither pattern stored by the common printer driver. For an image object, the tone processing is performed based on a value of a halftone (hereinafter referred to as a "halftone value") via an operating system (OS) of the terminal device 12.

Figure 3:
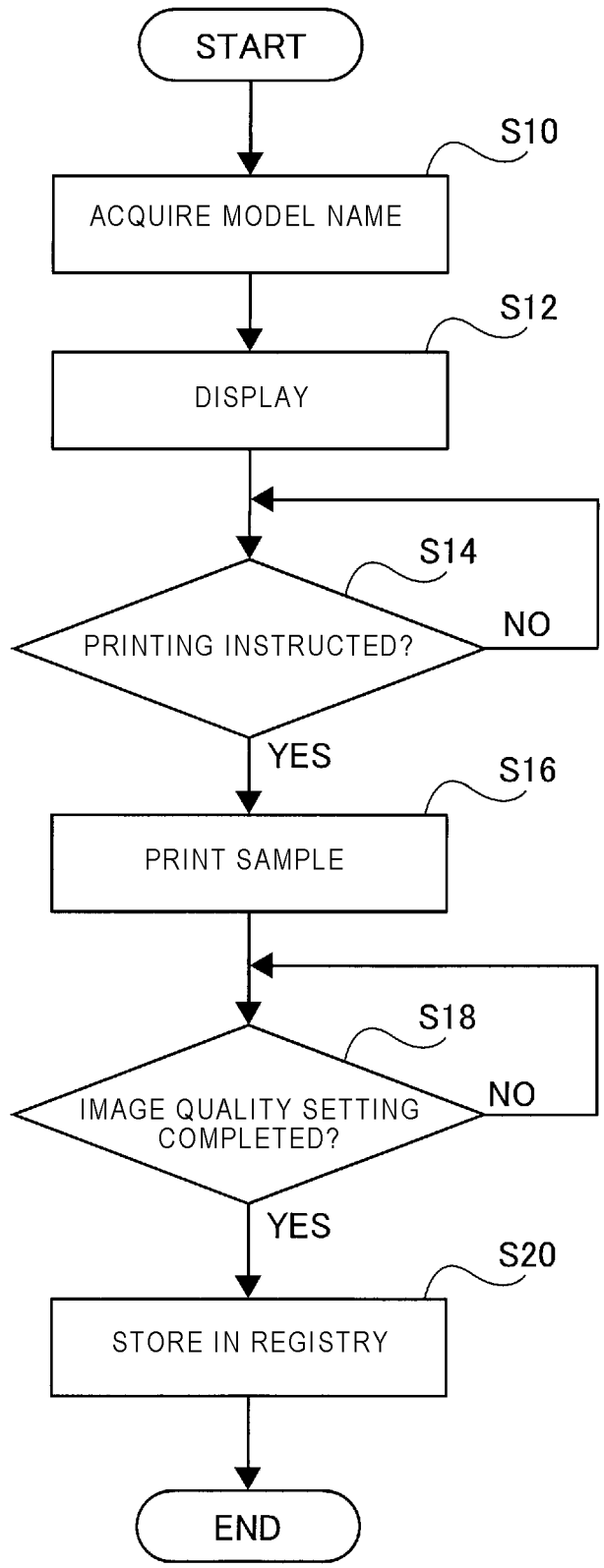
FIG. 3 is a flowchart for adjusting a density for each model by a common printer driver in the information processing apparatus according to the first exemplary embodiment of the present disclosure.

FIG. 3 is a flowchart for adjusting a density for each model by the common printer driver.

First, in step S10, a model name of the connected image forming apparatus 14a or 14b is acquired. The model name is acquired using, for example, the management information base (MIB) which is one of databases for managing devices in a communication network.

Figure 4:
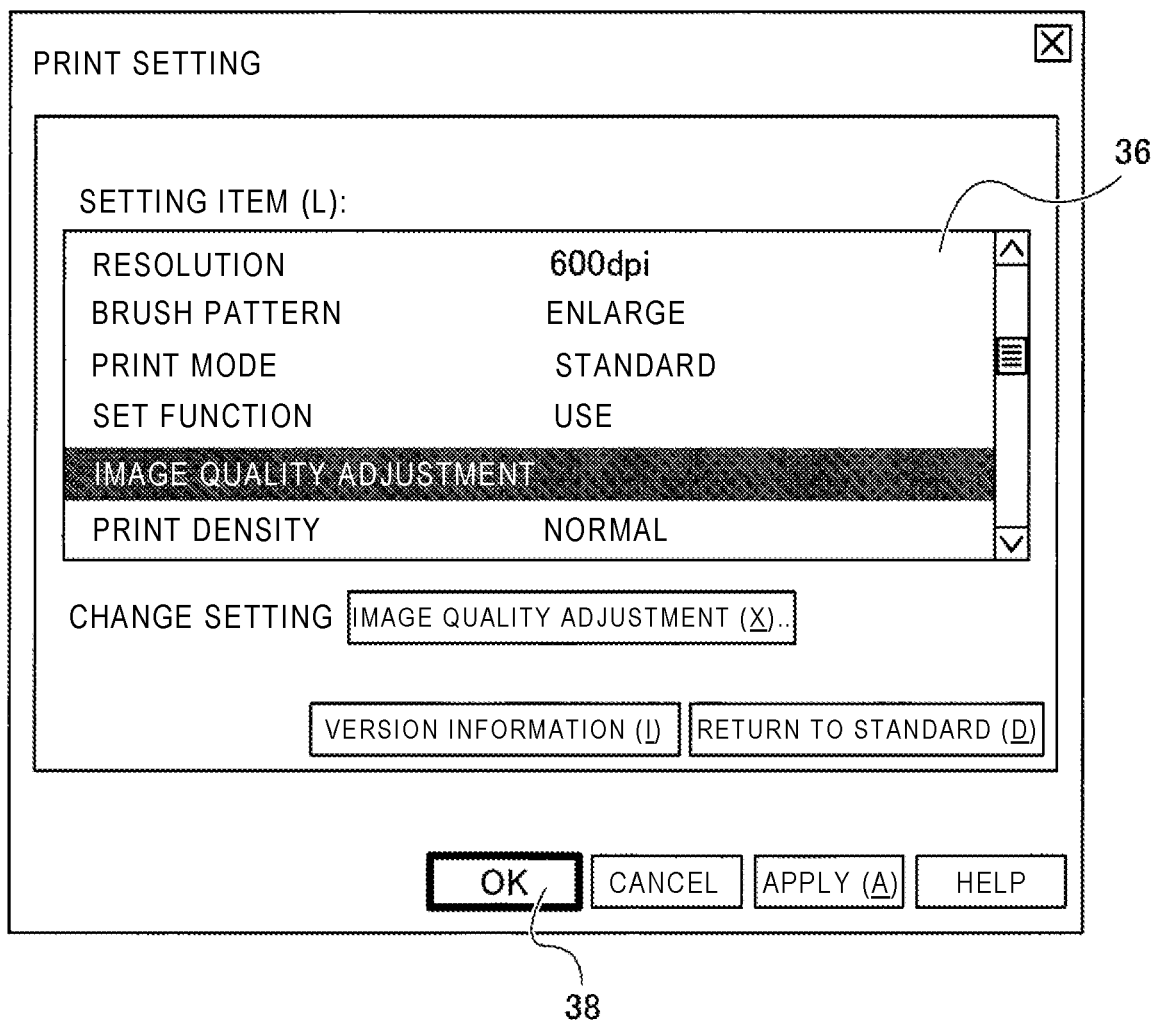
FIG. 4 is a diagram showing a screen for print setting in the information processing apparatus according to the first exemplary embodiment of the present disclosure.

In the next step S12, a screen for print setting is displayed on the display device 18. For example, as shown in FIG. 4, the screen for print setting includes a setting item display field 36 and operation buttons such as an "OK" button 38. The setting item display field 36 includes an item of "image quality adjustment". When a user selects the "image quality adjustment" and presses the "OK" button 38, a screen for adjusting image quality shown in FIG. 5 is displayed.

Figure 5:
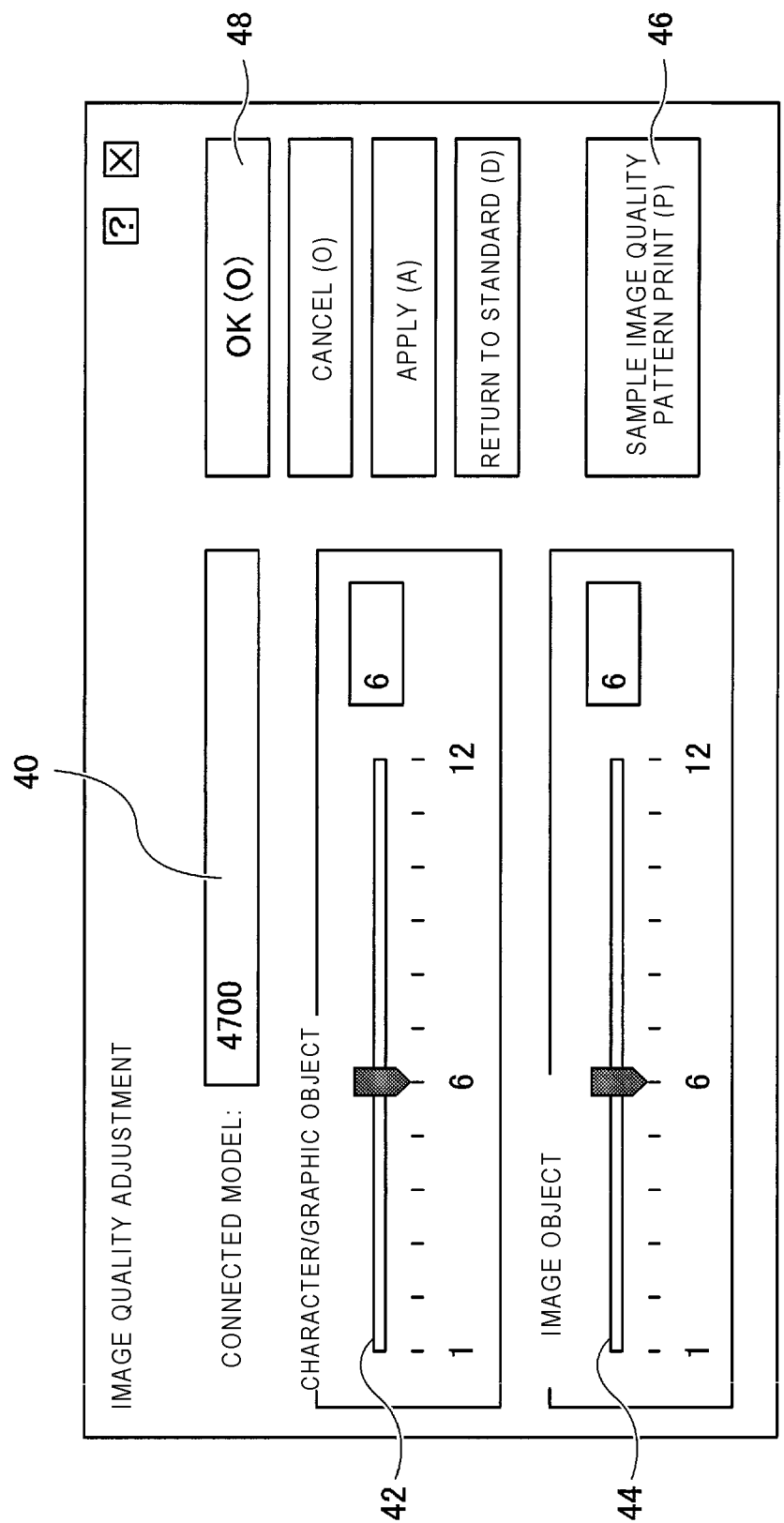
FIG. 5 is a diagram showing a screen for adjusting image quality in the information processing apparatus according to the first exemplary embodiment of the present disclosure.

As shown in FIG. 5, a screen for adjusting image quality includes a model display field 40 that displays a connected model, a first density setting slider 42 that allows the user to set a density for a character/graphic object, a second density setting slider 44 that allows the user to set a density for an image object, and operation buttons including a "sample image quality pattern print" button 46. The model name acquired in step S10 is displayed in the model display field 40.

In the next step 14, it is determined whether or not printing of a sample has been instructed. That is, it is determined whether or not the user has pressed the "sample image quality pattern print" button 46. If it is determined that the printing has been instructed, the process proceeds to step S16. If it is determined that the printing has not been instructed, the process waits until the printing is instructed.

In step S16, the image forming apparatus 14a or 14b of the connected model is instructed to print the sample.

Figure 6:
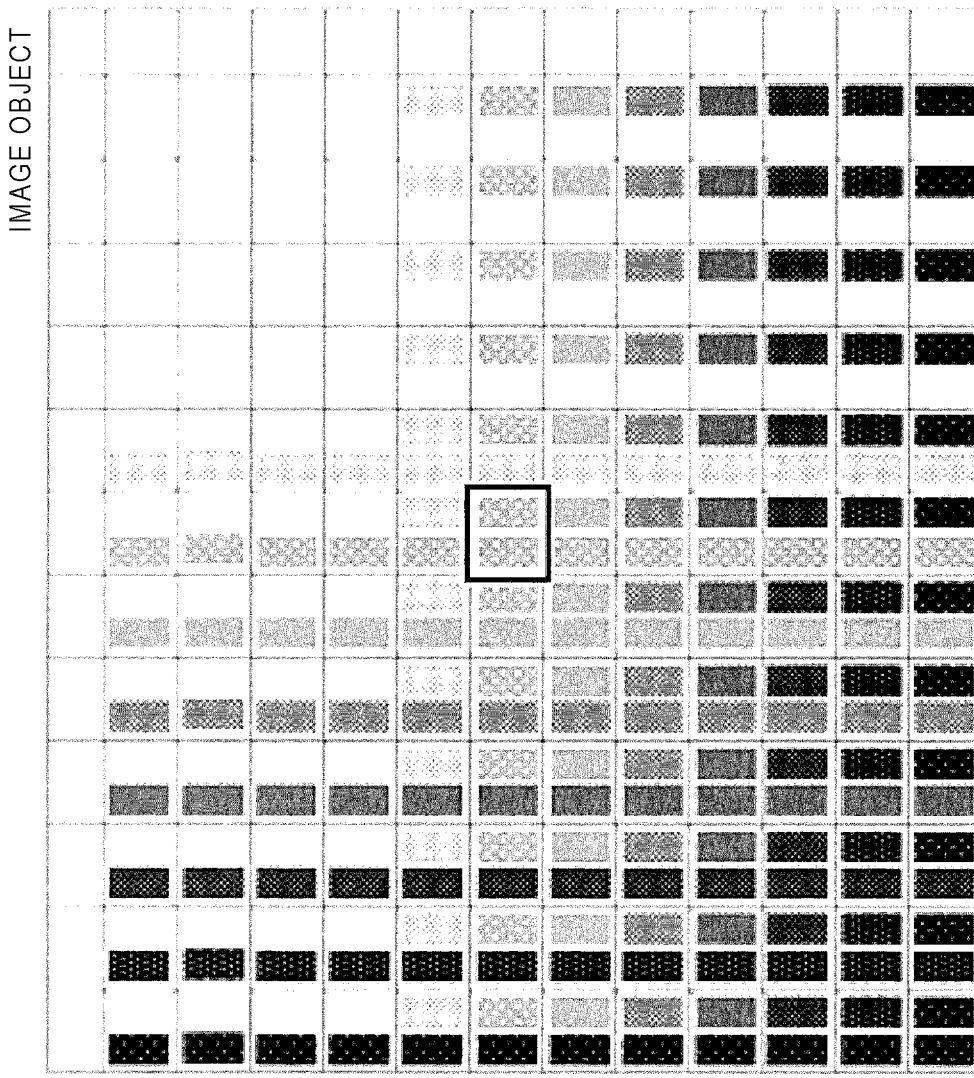
FIG. 6 is a plan view of a printed matter on which a sample pattern is printed in the first exemplary embodiment of the present disclosure.

FIG. 6 shows the printed sample. In the sample, twelve density patterns of the character/graphic object are printed along a horizontal axis, and twelve density patterns of the image object are printed along a vertical axis. 12×12 matrices are formed in vertical and horizontal directions. The density pattern of the character/graphic object is printed on an upper row of each matrix, and the density pattern of the image object is printed on a lower row of each matrix.

As described above, for each character/graphic object, a dither pattern is set based on a lookup table value for a dither pattern stored in the common printer driver. The lookup table values are divided into twelve portions from a value corresponding to the lightest density pattern to a value corresponding to the darkest density pattern, and the density patterns are stored in advance such that the density patterns are printed in upper rectangles of the matrices in the sample. The stored density patterns are printed. On the other hand, for each image object, a dither pattern is set based on a halftone value via the OS of the terminal device 12. The halftone values are divided into twelve portions from a value corresponding to the lightest density pattern to a value corresponding to the darkest density pattern, and the density patterns are stored in advance such that the density patterns are printed in lower rectangles of the matrices in the sample. The stored density patterns are printed. Each of the density patterns is numbered (hereinafter referred to as an "image quality parameter"). For example, when an image quality parameter 1 is selected for the character/graphic object and the image object, dither patterns are selected that cause the entire printed object to be lighter in accordance with the image quality parameter 1. When an image quality parameter 12 is selected for the character/graphic object and the image object, dither patterns are selected that cause the entire printed object to be darker in accordance with the image quality parameter 12.

In the next step S18, it is determined whether or not the setting of the image quality have been completed. If it is determined that the setting has been completed, the process proceeds to step S20. If it is determined that the setting has not been completed, the process waits for completion of setting. For example, when the user who has seen the sample has selected the image quality parameters for the character/graphic object and the image object, intermediate dither patterns are selected for both the character/graphic object and the image object as highlighted in FIG. 6, and both are balanced. Here, when the user presses the "OK" button 48, it is determined that the setting of the image quality has been completed, and the process proceeds to the next step S20.

Figure 7:
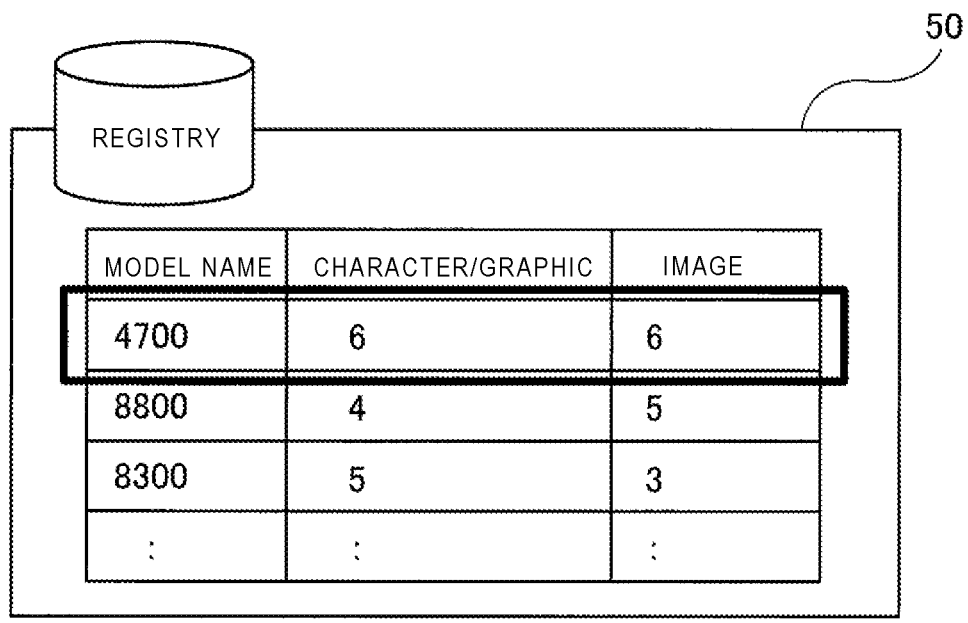
FIG. 7 is a table showing contents stored in a registry in the first exemplary embodiment of the present disclosure.

In step S20, as shown in FIG. 7, the image quality parameters are stored in a registry 50, and the process ends. The registry 50 is, for example, a database for setting information used in Windows (registered trademark) OS. In the registry 50, the model name, the image quality parameter for the character/graphic object and the image quality parameter for the image object are stored in association with each other.

Figure 8:
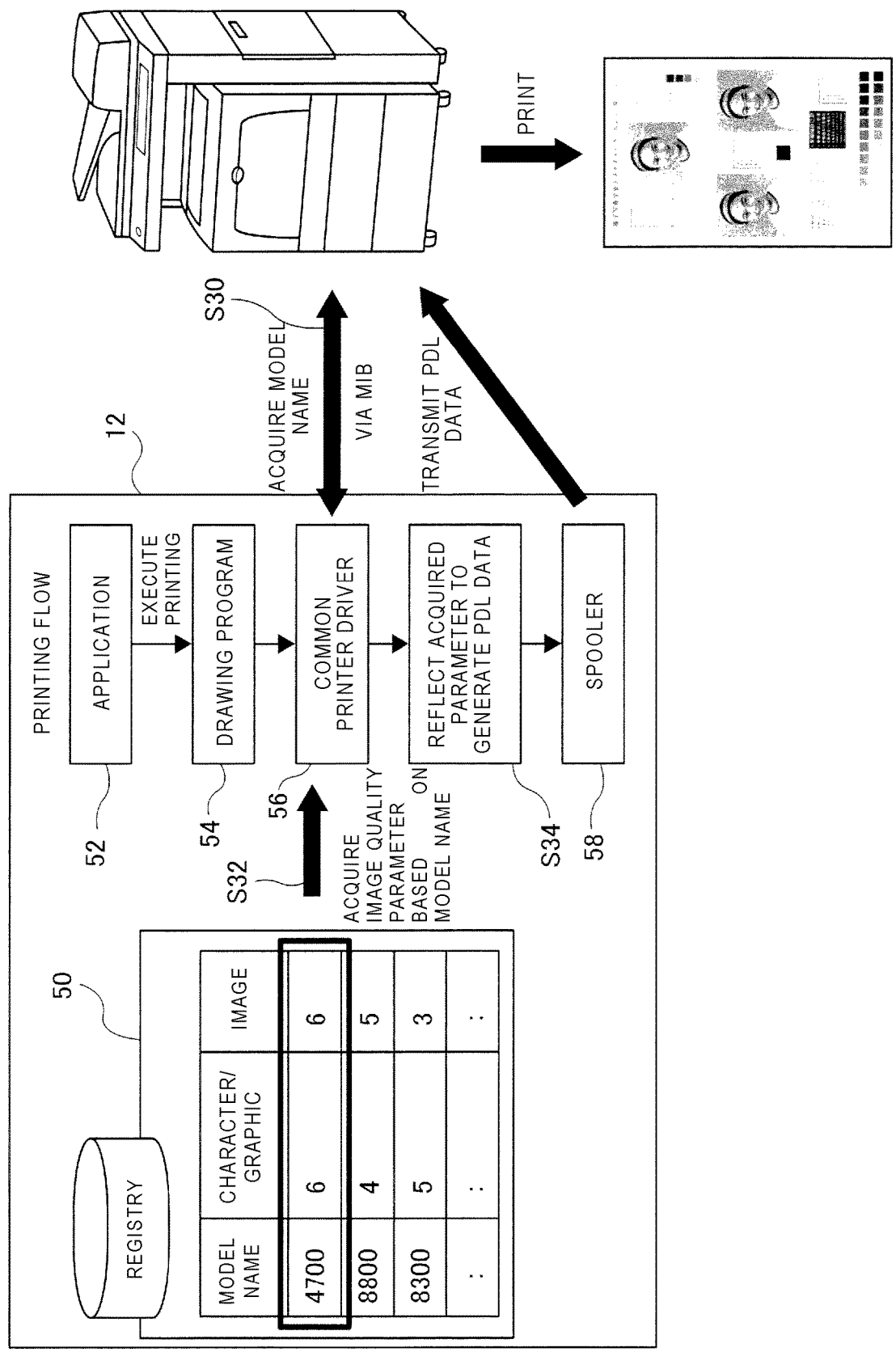
FIG. 8 is a diagram showing a control flow when printing is executed in the image forming system according to the first exemplary embodiment of the present disclosure.
Figure 9:
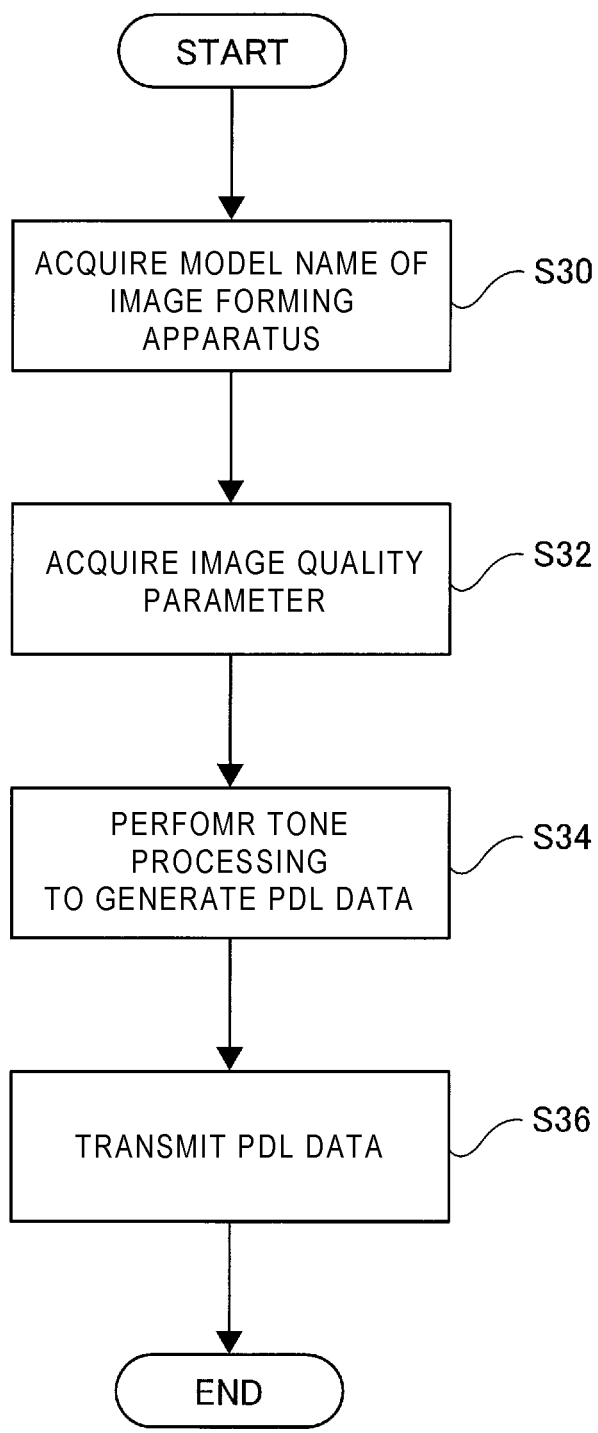
FIG. 9 is a flowchart showing a control flow when the printing is executed on the information processing apparatus according to the first exemplary embodiment of the present disclosure.

FIG. 8 is a diagram showing a control flow of the entire image forming system when the printing is executed.

As shown in FIG. 7, when printing a document created by an application program 52, PDL data is generated via a drawing program 54 and a common printer driver 56. The generated PDL data is transmitted from a spooler 58 to the image forming apparatus 14a or 14b. The image forming apparatus 14a or 14b converts the PDL data into bitmap data and executes the printing.

As shown in FIG. 8, the terminal device 12 acquires the connected model name in step S30. The connected model name is acquired via the MIB.

In the next step S32, the image quality parameters are acquired from the registry 50. As described above, the registry 50 stores the model name, the image quality parameter for the character/graphic object, and the image quality parameter for the image object in association with each other. Therefore, the image quality parameters are acquired based on the model name acquired in step 30.

In the next step S34, the tone processing is performed based on the image quality parameters acquired in step S32 to generate the PDL data.

In the next step S36, the PDL data is transmitted to the image forming apparatus 14a or 14b via the spooler 58, and the process ends.

Figure 10:
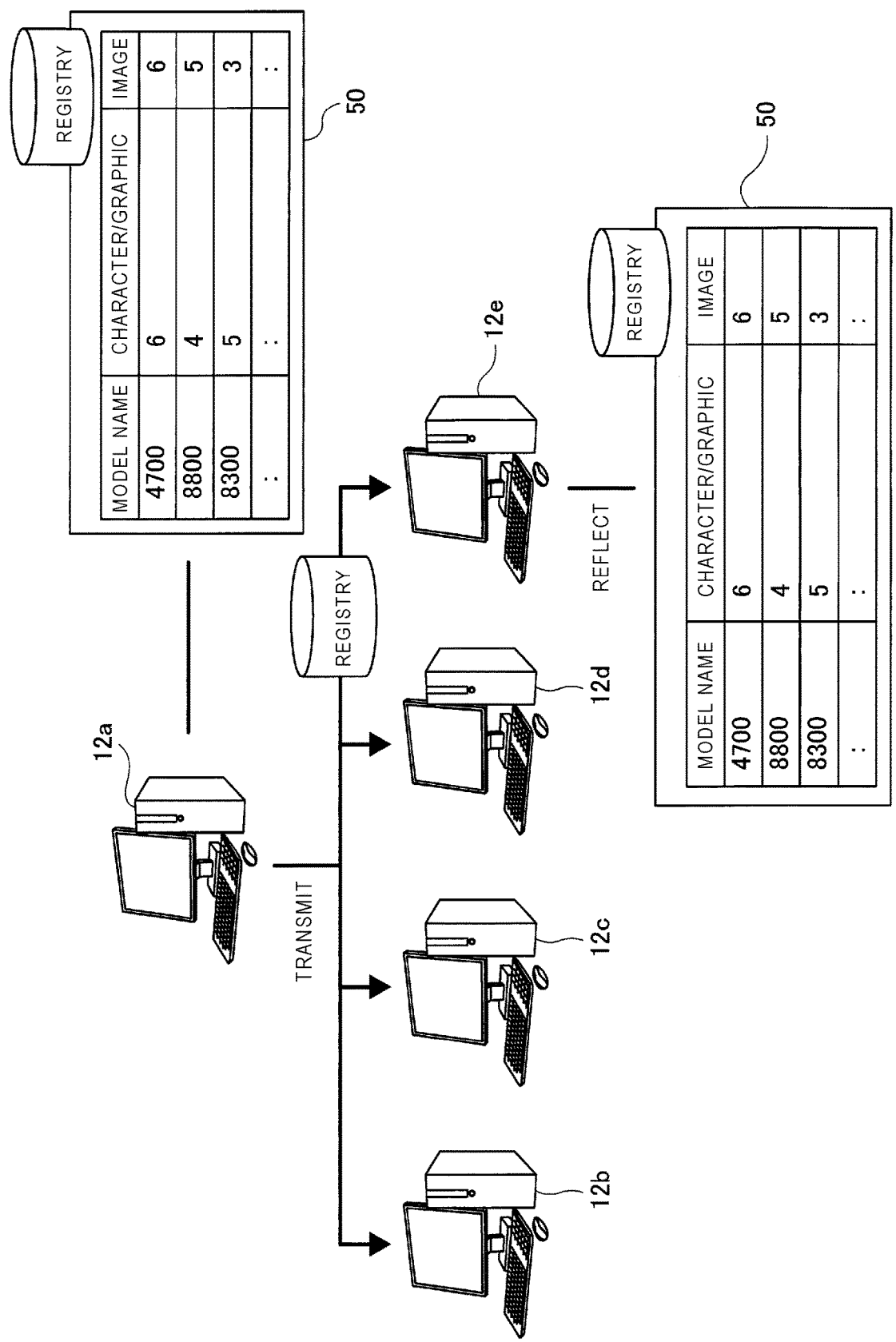
FIG. 10 is a block diagram showing an image forming system according to a second exemplary embodiment of the present disclosure.

FIG. 10 shows the image forming system 10 according to a second exemplary embodiment of the present disclosure. In the first exemplary embodiment, the registry 50 that stores the model name and the image quality parameter in association with each other is provided in each terminal device 12. In the second exemplary embodiment, the registry 50 common to plural terminal devices 12a to 12e is provided.

That is, for example, the registry 50 of one terminal device 12a is copied to the other terminal devices 12b to 12e. Copying of the registry 50 may be performed by transmitting the registry 50 from the terminal device 12a to another terminal device 12e, or may be performed via a portable memory. The contents of the registry may be stored in a server connected to the network or the Internet and transmitted to each terminal device, or may be uploaded to the server and be downloaded by each terminal device from the server.

In the exemplary embodiment, only the density adjustment has been described for the image quality adjustment. The present disclosure is not limited thereto. The present disclosure covers, for example, color adjustment, line thickness, and the like. In the color adjustment, a chart shown in FIG. 6 may be created for each color so as to allow a user to select a desired color. Further, the density pattern is presented to the user by printing by the image forming apparatus. Alternatively, the density pattern may be presented to the user by (i) reading the sample, which is printed by the image forming apparatus, with an image reading apparatus, and (ii) displaying the read sample on the display device of the terminal device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
control a display to display a graphical user interface including a first density setting slider for a character object, a second density setting slider for an image object, a specific model of an image forming apparatus, and a sample image quality pattern print button,
control an image forming apparatus to print an image having a plurality of density patterns printed thereon in response to selection of the sample image quality pattern print button, each of the plurality of density patterns including a first section that is a density pattern of the character object, and a second section that is a density pattern of the image object, and
receive a first setting value of a density parameter for the character object and a second setting value of a density parameter for the image object, via a user selection on the graphical user interface that corresponds to one of the printed plurality of density patterns;
a storage configured to store the first and second setting values for the specific model of the image forming apparatus from among a plurality of models of image forming apparatuses; and
wherein the processor is further programmed to control the specific model of the image forming apparatus according to the first and second setting values stored in the storage.

2. The information processing apparatus according to claim 1,
wherein the processor is programmed to acquire a model name of the specific model, and
the processor is programmed to control the storage to store the model name in association with the setting value.

3. The information processing apparatus according to claim 1, wherein the plurality of density patterns is arranged as an N by N matrix, N being an integer greater than or equal to 2.

4. An image forming system comprising:
a plurality of image forming apparatuses including a plurality of models, the image forming apparatuses being each configured to form an image on a recording medium; and
at least one information processing apparatus configured to transmit image data to be formed, to a selected one of the image forming apparatuses, wherein the information processing apparatus comprises
a processor programmed to:
control a display to display a graphical user interface including a first density setting slider for a character object, a second density setting slider for an image object, a specific model of the selected one image forming apparatus, and a sample image quality pattern print button,
control the selected one image forming apparatus to print an image having a plurality of density patterns printed thereon, in response to selection of the sample image quality pattern print button, each of the plurality of density patterns including a first section that is a density pattern of the character object, and a second section that is a density pattern of the image object, and receive a first setting value of a density parameter for the character object and a second setting value of a density parameter for the image object, via a user selection on the graphical user interface that corresponds to one of the printed plurality of density patterns, a storage configured to store the first and second setting values for each of a specific model of the models of the image forming apparatuses that are a same model as the selected one image forming apparatus, and wherein the processor is further programmed to control each image forming apparatus of the specific model according to the first and second setting values stored in the storage.

5. The image forming system according to claim 4, wherein the at least one information processing apparatus comprises a plurality of information processing apparatuses, and the information processing apparatuses share the first and second setting values stored in the storages.

6. The image forming system according to claim 4, wherein the plurality of density patterns is arranged as an N by N matrix, N being an integer greater than or equal to 2.

7. A non-transitory computer readable medium storing a program causing a computer to execute information processing, the information processing comprising:

controlling a display to display a graphical user interface including a first density setting slider for a character object, a second density setting slider for an image object, a specific model of an image forming apparatus, and a sample image quality pattern print button;

controlling an image forming apparatus to print an image having a plurality of density patterns printed thereon, in response to selection of the sample image quality pattern print button, each of the plurality of density patterns including a first section that is a density pattern of the character object, and a second section that is a density pattern of the image object;

receiving a first setting value of a density parameter for the character object and a second setting value of a density parameter for the image object, via a user selection on the graphical user interface that corresponds to one of the printed plurality of density patterns;

storing the first and second setting values for the specific model of the image forming apparatus from among a plurality of models of image forming apparatuses; and controlling the specific model of the image forming apparatus according to the first and second setting value that are stored.

8. The non-transitory computer readable medium according to claim 7, wherein the plurality of density patterns is arranged as an N by N matrix, N being an integer greater than or equal to 2.

* * * * *